US012168521B2

(12) United States Patent
Rawdon et al.

(10) Patent No.: US 12,168,521 B2
(45) Date of Patent: Dec. 17, 2024

(54) SYSTEMS AND METHODS FOR A BLENDED WING BODY AIRCRAFT WITH PERMANENT TANKS

(71) Applicant: JetZero, Inc., Long Beach, CA (US)

(72) Inventors: Blaine Knight Rawdon, San Pedro, CA (US); Ronald Tatsuji Kawai, Rancho Palos Verdes, CA (US); Thomas James O'Leary, Orange, CA (US); Terrence Kevin O'Leary, Jr., Dripping Springs, TX (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/731,655

(22) Filed: Apr. 28, 2022

(65) Prior Publication Data

US 2023/0348089 A1 Nov. 2, 2023

(51) Int. Cl.
*B64D 37/04* (2006.01)
*B64C 39/10* (2006.01)
*B64D 37/08* (2006.01)
*B64D 37/30* (2006.01)

(52) U.S. Cl.
CPC .............. *B64D 37/04* (2013.01); *B64C 39/10* (2013.01); *B64D 37/08* (2013.01); *B64D 37/30* (2013.01); *B64C 2039/105* (2013.01)

(58) Field of Classification Search
CPC .............. B64D 37/02–10; B64C 39/10; B64C 2039/105
See application file for complete search history.

(56) References Cited

U.S. PATENT DOCUMENTS

| 2,995,268 | A | * | 8/1961 | Kurtovich | B64D 37/06 244/135 R |
|---|---|---|---|---|---|
| 3,147,941 | A | | 9/1964 | Hawthorne | |
| 4,258,082 | A | * | 3/1981 | Horne | B60K 15/03 280/832 |
| 5,833,172 | A | | 11/1998 | Grafwallner et al. | |
| 6,123,295 | A | * | 9/2000 | Wexler | B64G 1/14 244/119 |
| 6,422,514 | B1 | * | 7/2002 | Clark | B64G 1/402 244/172.3 |
| 7,600,717 | B2 | | 10/2009 | Ward | |

(Continued)

FOREIGN PATENT DOCUMENTS

| WO | 2011026965 | | 3/2011 |
|---|---|---|---|
| WO | 2011026965 | A2 | 4/2011 |

OTHER PUBLICATIONS

Christopher Winnefeld, et al., Modelling and Designing Cryogenic Hydrogen Tanks for Future Aircraft Applications, Jan. 3, 2018.

(Continued)

*Primary Examiner* — Philip J Bonzell
*Assistant Examiner* — Ashesh Dangol
(74) *Attorney, Agent, or Firm* — Caldwell Intellectual Property Law

(57) ABSTRACT

A system and method for a blended wing body aircraft with permanent tanks is presented. The aircraft comprises a blended wing body and at least a tank permanently attached the blended wing body. The at least a tank is configured to store liquified gas fuel and further comprises at least a vent configured to vent gaseous fuel from the at least a tank and an insulation to reduce thermal transfer to the liquified gas fuel inside of the at least a tank.

14 Claims, 18 Drawing Sheets

(56) References Cited

U.S. PATENT DOCUMENTS

| | | |
|---|---|---|
| 7,806,365 B2 | 10/2010 | Miller et al. |
| 8,308,106 B2 | 11/2012 | Maccready et al. |
| 8,371,533 B2 | 2/2013 | Tichborne et al. |
| 9,493,246 B2 | 11/2016 | Barmichev et al. |
| 10,279,921 B2 | 5/2019 | Simpson |
| 10,308,369 B2 | 6/2019 | Laguia-Barnola et al. |
| 2009/0090724 A1* | 4/2009 | Childress ............... B64D 37/06 244/135 R |
| 2011/0121130 A1* | 5/2011 | Odle ........................ B64C 1/22 244/36 |
| 2012/0025006 A1* | 2/2012 | Luther ..................... B64C 1/00 244/2 |
| 2015/0069184 A1* | 3/2015 | Barmichev ........... B64D 37/30 244/135 R |
| 2015/0360792 A1* | 12/2015 | Faure ................... F17C 13/008 244/135 R |
| 2016/0009402 A1* | 1/2016 | Hunter .................. B64D 27/02 244/53 R |
| 2016/0195013 A1* | 7/2016 | Epstein .................... F02C 9/40 60/39.463 |
| 2022/0381185 A1* | 12/2022 | Muldoon ................ F02C 7/277 |

OTHER PUBLICATIONS

C.W.C. Van Woensel, Integration of a Liquid Hydrogen Fuel Tank into the Concept of the Flying-V, Feb. 22, 2022.

\* cited by examiner

SYSTEMS AND METHODS FOR A BLENDED WING BODY AIRCRAFT WITH PERMANENT TANKS

FIELD OF THE INVENTION

The present invention generally relates to the field of air travel. In particular, the present invention is directed to a system and method for a blended wing body aircraft with permanent tanks.

BACKGROUND

Hydrogen fuel has characteristics favorable as an aviation fuel.

SUMMARY OF THE DISCLOSURE

In an aspect, a system for a blended wing body aircraft with permanent tanks is shown. The aircraft comprises a blended wing body and at least a tank permanently attached the blended wing body. The at least a tank is configured to store liquified gas fuel and further comprises at least a vent configured to vent gaseous fuel from the at least a tank and an insulation to reduce thermal transfer to the liquified gas fuel inside of the at least a tank.

In another aspect, a method of use for a blended wing body aircraft with permanent tanks is illustrated. The method of use comprises permanently attaching at least a tank into a blended wing body of the blended wing body aircraft, storing liquified gas fuel inside the at least a tank, burning the liquified gas fuel to power the blended wing body aircraft, venting gaseous fuel from the at least a tank using at least a vent, and reducing thermal transfer to the liquified gas fuel inside of the at least a tank using an insulation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure include a system for a blended wing body aircraft with permanent tanks. Aspects of the present disclosure include a blended wing body. Aspects of the present disclosure include at least a tank permanently attached the blended wing body. Aspects of the present disclosure include storing liquid hydrogen fuel inside the at least a tank. Aspects of the present disclosure further comprise at least a vent configured to vent gaseous hydrogen from the at least a tank and an insulation to reduce thermal transfer to the liquid hydrogen fuel inside of the at least a tank.

Aspects of the present disclosure include a method of use for a blended wing body aircraft with permanent tanks. Aspects of the present disclosure include permanently attaching at least a tank into a blended wing body of the blended wing body aircraft. Aspects of the present disclosure include storing liquid hydrogen fuel inside the at least a tank. Aspects of the present disclosure include burning the liquid hydrogen fuel to power the blended wing body aircraft. Aspects of the present disclosure include venting gaseous hydrogen from the at least a tank using at least a vent. Aspects of the present disclosure include reducing thermal transfer to the liquid hydrogen fuel inside of the at least a tank using an insulation.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 1A. Furthermore, there is no intention to be bound by any expressed or implied theory presented in this disclosure.

Figure 1A:
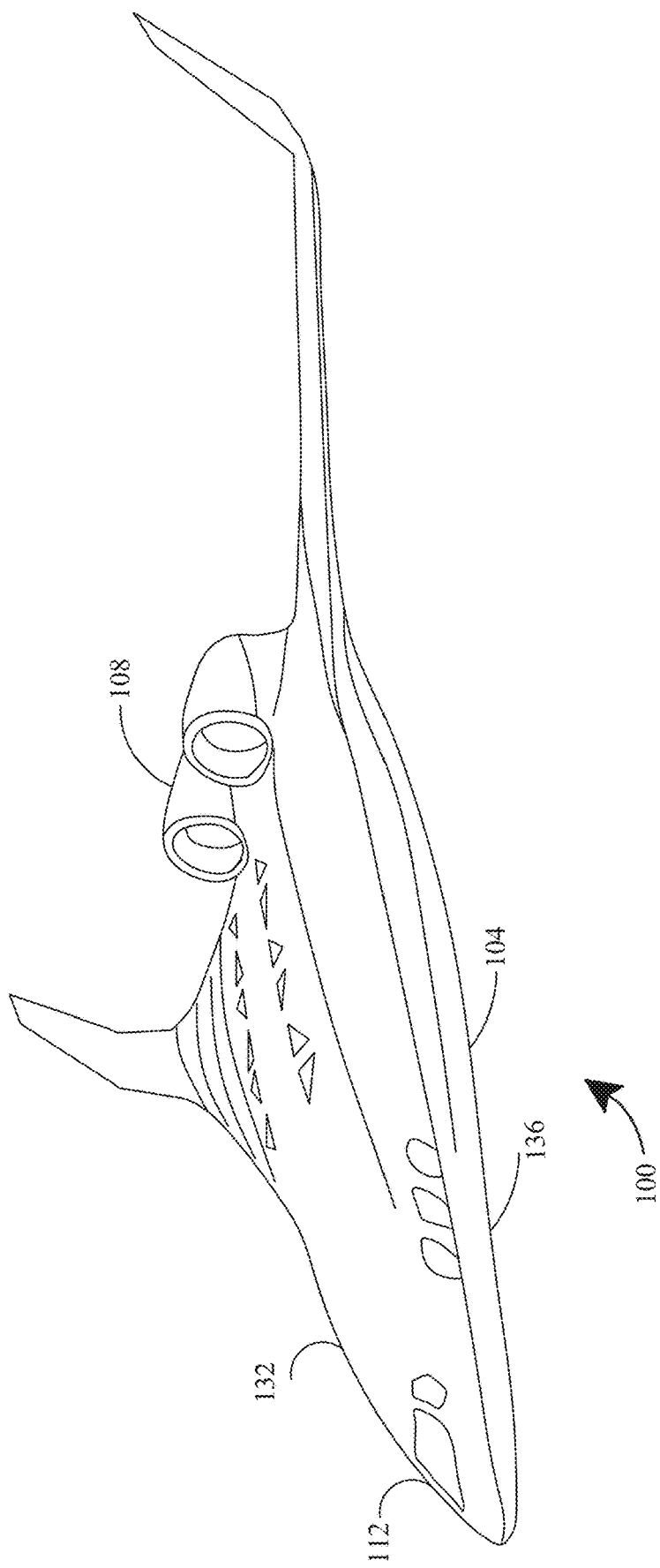
FIG. 1A is an exemplary embodiment of a blended wing body aircraft.

Referring now to FIG. 1A, an exemplary embodiment of a blended wing body aircraft is illustrated. System may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1A, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring to FIG. 1A, an exemplary blended wing aircraft 100 is illustrated. Aircraft 100 may include a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB 104. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1A, BWB 104 of aircraft 100 may include a nose portion. A "nose portion," for the purposes of this disclosure, refers to any portion of aircraft 100 forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1A, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1A, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1A, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be defined in terms of stress and strain, wherein "stress" is force per area and "strain" is a elongation or deformation generally represented as a proportion or fraction of a length or angle. For example, the strain of a one-hundred-inch-long rod that is stretched to 101 inches is the one inch of stretch divided by the one-hundred-inch length, or a 1% strain. In the case of shear, strain may be measured by an angular deformation. Rigidity may be considered analogous to stiffness and, for linear displacements, may be quantified as Young's modulus. Young's modulus may be defined as stress divided by strain. Rigidity may be defined as a force necessary to bend and/or flex a material and/or structure to a given degree. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1A, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contain an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1A, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1A, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1A, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1A, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin 132 of the wing and the upper skin 132 would also collapse into the lower skin 136 under bending loads. In some cases, deformations are prevented with ribs that support stringers which stabilize the skin. Fuselages are similar with bulkheads or frames, and stringers.

With continued reference to FIG. 1A, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1A, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 1A, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1A, aircraft 100 may include at least a flight component 108. A flight component 108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1A, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1A, at least a flight component may be one or more devices configured to affect aircraft's 100 attitude. "Attitude", for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum", for the purposes of this disclosure, refers to at least an element of data identifying an attitude of an aircraft 100.

With continued reference to FIG. 1A, in some cases, aircraft 100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1A, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 100. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1A, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component 108 may include any propulsor as described herein. In embodiment, at least a flight component 108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1A, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1A, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1A, at least a flight component 108 may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise—be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1A, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1A, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fuel, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion 112 of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1A, modular aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1A, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells May produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1A, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1A, aircraft 100 may include multiple flight component 108 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 108. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1A, aircraft 100 may include a flight component 108 that includes at least a nacelle 108. For the purposes of this disclosure, a "nacelle" is a streamlined body housing, which is sized according to that which is houses, such as without limitation an engine, a fuel store, or a flight component. When attached by a pylon entirely outside an airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1A, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1A, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1A, in nonlimiting embodiments, at least a flight component 108 may include an airbreathing engine such as a jet engine, turbojet engine, turboshaft engine, ramjet engine, scramjet engine, hybrid propulsion system, turbofan engine, or the like. At least a flight component 108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1A, an aircraft 100 may include a flight controller. As used in this disclosure, a "flight controller" is a device that generates signals for controlling at least a flight component 108 of an aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1A, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1A, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, a propulsor of aircraft 100 may comprise a combustion engine. Combustion engine is configured to burn the fuel from the fuel source to produce mechanical work. Resulting mechanical work may be used to power the propulsor. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that includes a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element. Additionally, at least an electric motor of the propulsor may be operatively connected with a fuel cell by way of electrical communication, for example through one or more conductors.

Still referring to FIG. 1A, aircraft 100 may comprise at least an auxiliary power unit powered by the fuel and mechanically affixed to the aircraft. As used in this disclosure, an "auxiliary power unit" is a power system, such as without limitation an electrical circuit or mechanical power source, that provides electrical energy to non-propulsor flight components of an aircraft. Exemplary non-limiting non-propulsor flight component include an avionic system, a flight control system, an environmental control system, and anti-ice system, a lighting system, a fuel system, a braking system, and/or a landing gear system.

Figure 1B:
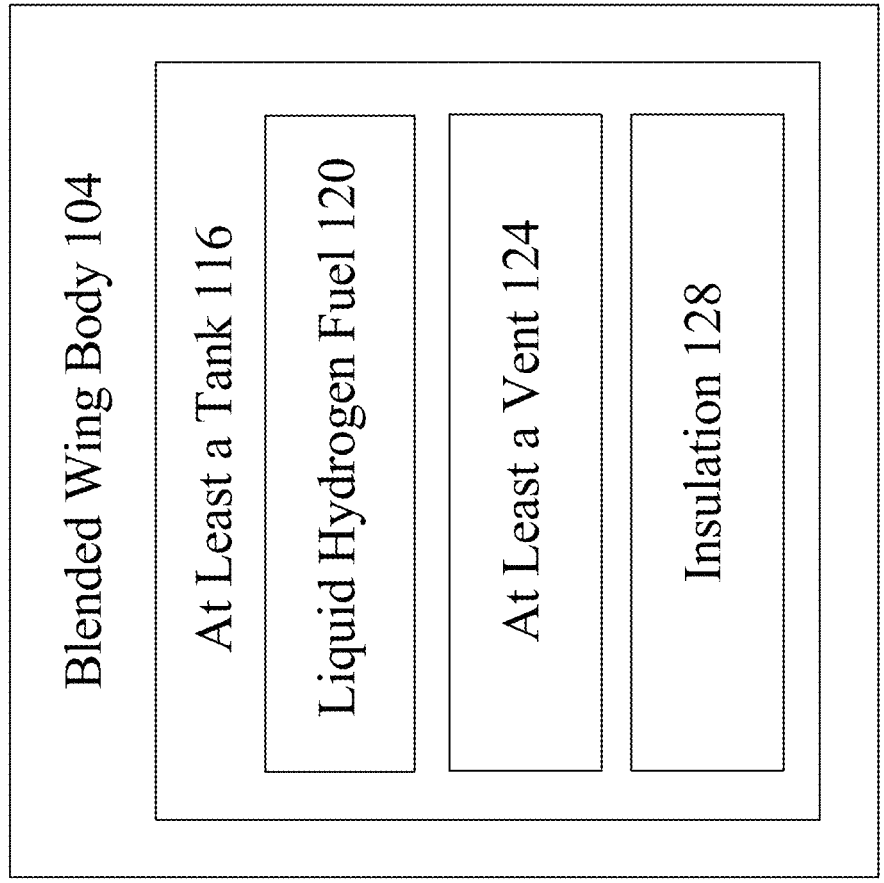
FIG. 1B is a block diagram for the exemplary embodiment of a blended wing body aircraft with permanent tanks.

Now referring to FIG. 1B, a block diagram for the exemplary embodiment of a blended wing body aircraft with permanent tanks is shown. Aircraft 100 may include at least a tank 116. In this disclosure, a "tank" is a container of fluids, for example for flammable fluids, such as fuel. In an embodiment, at least a tank 116 stores fuel to power aircraft 100. At least a tank 116 may be permanently attached to aircraft 100. As used in this disclosure, a tank may be "permanently attached" when it is configured to not be removed during ordinary use. For example, a tank permanently attached to aircraft may be removed during maintenance or overhaul but is otherwise a permanent flight component of the aircraft. At least a tank 116 may include one or more compartments to store fuel in. In some embodiments, all compartments of at least a tank 116 may have fluidic communication between one another. Accordingly, in these embodiments, all compartments may have substantially similar pressures. At least a tank 116 may be a part of fuel delivery system for an engine, in which the fuel may be stored inside the at least a tank and then propelled or released into an engine, such as without limitation a combustion engine. At least a tank 116 may be a pressure vessel. Tank may be configured to store a liquified gas fuel. As used in this disclosure, a "liquified gas fuel" is a fuel that at standard atmospheric conditions or when utilized (e.g., combusted) is gas and is stored as a fuel. Liquified gas fuels include without limitation liquid hydrogen, propane, and liquified natural gas. A "pressure vessel" is a container configured to hold fluids at a pressure that may differ from an ambient pressure. Pressure vessel may be configured to be pressurized in order to allow flow of gaseous fuel (e.g., hydrogen, propane or natural gas) from at least a tank 116, for example without a need to pump. In an embodiment, but without limitation, at least a tank 116 may act as a pressure vessel to store the fuel at a high pressures above 5 psig, 15 psig, 50 psig, or the like. At least a tank 116 may be made of any material able to withstand such high pressure, such as but without limitation, aluminum, carbon fiber, composite materials, or the like. Furthermore, at least a tank 116 may further include an inner wall and an outer wall. At least a tank 116 may also include safety valves, closures, vessel threads, or any other features that can be found on fuel tanks. At least a tank 116 may further have a tank geometry. "Tank geometry" refers to an overall shape and arrangement of at least a tank 116. A least a tank 116 may include one or more curvatures, for example the at least a tank 116 may have one or more surfaces with spherical and/or cylindrical shapes. According to some embodiments, tank geometry for a blended wing body aircraft 104 may be driven by at least five objectives: (1) to provide as much fuel volume as possible while using little payload floor space, (2) to provide a fuel tank shape that resists pressure and that is lightweight, (3) to provide a fuel tank shape that can be insulated between outer wall and inner wall, (4) to provide a fuel center of gravity that is not widely misaligned with the aircraft's center of gravity, and (5) to provide fuel tanks that are compatible with a passenger cabin. In this disclosure, a "fuel center of gravity" is the center of gravity of the fuel inside at least a tank 116. In some cases, fuel center of gravity may affect overall aircraft center of gravity. Fuel center of gravity may be associated with a volume within airplane that has sufficient volume to store a practical quantity of fuel in discrete tanks. At least a tank 116 may be arranged inside blended wing body 104 as a function of its fuel center of gravity in relation to center of gravity of aircraft 100. Tank geometry is further discussed herein with reference to FIGS. 2 and 3A-N.

With continued reference to FIG. 1B, blended wing body 104 comprises at least a tank 116, which further includes liquid hydrogen fuel 120, at least a vent 124, and an insulation 128. At least a tank 116 may be a permanent tank. A "permanent tank" is a tank that is permanently attached to aircraft 100. A permanent tank may be added to an existing airplane or attached during the airplane's construction. In either case, the intention of a permanent tank may be to leave at least a tank 116 in place for an extended period. A permanent tank may integrate at least a tank 116 and BWB 104 structure so that the BWB 104 supports at least a tank 116, and/or at least a tank 116 supports BWB 104. In some embodiments, curved surfaces of tank 116 may not be well suited to assisting structural surfaces of BWB 104. However, in some embodiments, a septa of multi-bubble tanks may be well-suited to carry structural loads, for example loads intrinsic to the tank as well as loads extrinsic to the tank (e.g., loads resulting from pressurization of aircraft). As used in this disclosure, a "septa" is a structural element within a tank between chambers. In some cases, a septa may be perforated or otherwise allow for fluidic communication between two or more chambers on opposing sides of the septa. Relationship between at least a tank 116 and BWB 104 is further described herein with reference to FIG. 3L.

Still referring to FIG. 1B, at least a tank 116 is filled with a fuel, wherein that fuel is liquid hydrogen fuel 120. Hydrogen fuel 124 may be stored as a compressed gas or in liquid form, but however, liquid hydrogen may be used for airliner-scale systems. Liquid hydrogen fuel 120 may a higher density than gaseous hydrogen; even so, liquid hydrogen fuel 120 may require about four times the volume of Jet-A fuel. Additionally, liquid hydrogen fuel 120 may also allow for reduced tank pressure and tank weight. Liquid hydrogen fuel 120 may be kept at extremely low, cold temperatures, for example below its critical point of 33 Kelvin. Gas turbine engines, such as combustion engines, may operate on gaseous fuel (e.g., hydrogen, propane, or natural gas) and may transition liquified gas fuel 120 into a gas before consumption; gaseous fuel may be supplied to the engine at high pressure, but typically no fuel pump is used. In some embodiments, the gas may squirt into a combustion chamber due to compressor stages. Fuel (e.g., hydrogen, propane, or natural gas) vapor from tank ullage may be combined with the fuel vapor from an output of a fuel heater. In some cases, this combined channel may then lead to engine for combustion. When boiled, a rate of boil-off for liquid fuel 120 may be determined as a function of heat energy applied to liquid fuel 120. Boil-off for liquid fuel 120 can be selected, but at least a tank 116 may be insulated with an insulation 128 to control application of heat to tank contents. At least a tank 116 may also be refrigerated to remove heat from liquid fuel 120. The degree of insulation 128 may be selected to provide a desired rate of boil-off. Insulation 128 is further described below. The selected rate of boil-off for liquid fuel 120 may generally be less than the rate at which liquid hydrogen fuel 120 is consumed by the engines and possibly other aircraft systems, such as without limitation an APU. Excess boil-off may be dumped overboard or outside of aircraft through a vent.

Continuing to refer to FIG. 1B, at least a tank 116 comprises at least a vent 124. As used in this disclosure, a "vent" is an opening and/or aperture configured to allow one or more fluids to pass. In an embodiment, at least a vent 124 may be configured to vent gaseous fuel (e.g., hydrogen, propane, or natural gas) from at least a tank 116. Gaseous fuel may result from boil-off of liquified gas fuel 120 as the fuel warms. In an embodiment, and without limitation, at least a vent 124 may be configured to vent boil-off from at least a tank 116. In some cases, at least a vent 124 may include a check valve. As used in this disclosure, a "check valve" is a valve that permits flow of a fluid only in certain (e.g., one) directions. In some cases check valve may be configured to allow flow of fluids substantially only away from at least a tank 116 while preventing back flow of vented fluid to at least a tank 116. At least a vent 124 may also include a pressure regulator. A "pressure regulator" is a type of valve that controls the pressure of a fluid. Venting gaseous fuel from at least tank 120 prevents over-pressurizing or other events that may cause catastrophic damage or harm. It may also desirable, when aircraft 100 is grounded, to connect a system of lines and tanks to at least a vent 124 to collect the boiled-off hydrogen. In some cases, the collected gaseous fuel can be compressed by a pump into storage tanks and then cooled to liquid temperatures for reuse as aircraft fuel.

Still referring to FIG. 1B, at least a tank 116 may include an insulation 128. In this disclosure, "insulation" is a component or layer configured to reduce heat transfer. Insulation 128 may be used to reduce thermal transfer to liquified gas fuel (e.g., hydrogen, propane, or natural gas) inside of at least a tank 104. Heat may be transferred to at least a tank 116 by at least two means: conduction and radiation. To reduce conduction, insulation 128 may include a vacuum to separate an interior volume of at least a tank 116 from an exterior with an evacuated vessel. Another means to reduce conduction in at least a tank 116 may be an insulating material that inhibits conduction. Insulating materials include fiberglass wool, plastic or ceramic foam, aerogel, and other materials. Heat flow through an insulator can be inversely proportional to its thickness. For example, an insulator that is twice as thick may conduct heat at half the rate. Heat transfer by radiation may be reduced by reflective coatings. Reflective coatings may be located proximal surfaces of at least a tank 116 and/or on intermediate materials within insulation 128. For example, a dewar may be coated with a mirror-like material that reflects heat radiation; many thermos bottles are silvered for this reason. A "dewar" is double-walled flask of metal or silvered glass with a vacuum between the walls and configured to hold a liquid. Another means to reduce radiation may be to sandwich multiple layers of thin reflective foil within an insulative material such as foam. Additionally, a modest amount of insulation 128 may be needed to limit boil-off to a rate below that needed to provide fuel vapor to the engines in cruise. On the ground, a system to capture boil-off liquid fuel 120 may be provided. Another characteristic requirements for insulation 128 includes surface area of at least at tank 120. A very large tank may provide a large volume of liquified gas fuel 120 per unit surface area. Boil-off rate may be determined by heat transferred into at least a tank 116. Heat transferred into the at least a tank 116 may be a function of tank surface area and/or insulation effectiveness. For example, heat transferred into at least a tank 116 may be proportional to tank surface area and/or inversely proportional to insulation effectiveness. For a given insulation and storage volume, at least a tank 116 having a larger surface area may result in more boil-off. Or, for a given boil-off rate and storage volume, at least a tank 116 having a larger surface area will need more insulation 128. As explained above, degree of insulation may be selected to provide a desired rate of boil-off. Insulation 128 may also include a chamber located between the inner wall and the outer wall foams, aerogels, reflective materials, and the like of at least a tank 116. Chamber may contain gas such as air, nitrogen, argon or the like. In some cases, gas may be actively pumped into the chamber to ensure that the gas within the chamber is clean and dry and thereby not conducive to condensation, freezing or contamination.

Figure 2:
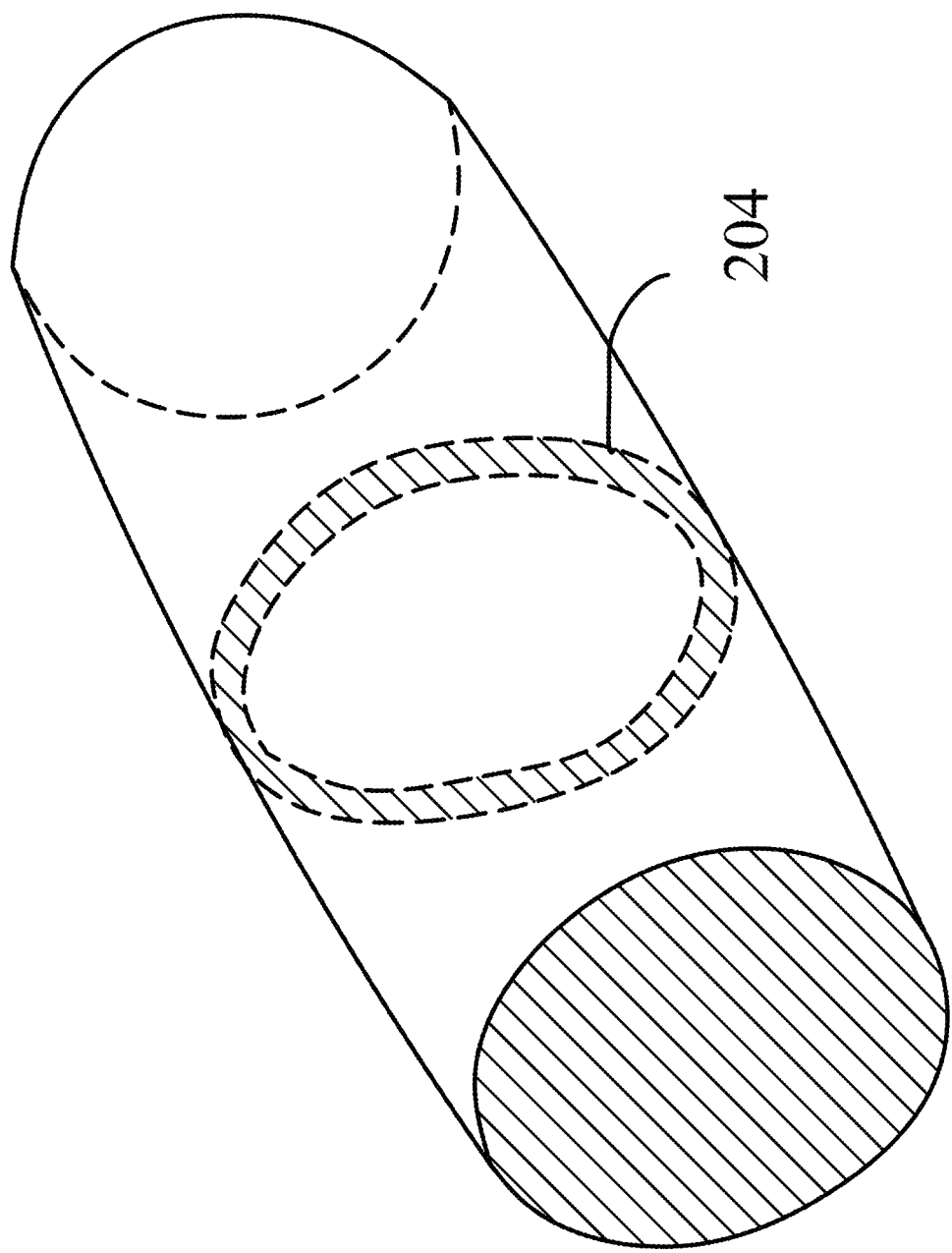
FIG. 2 is an exemplary embodiment of at least a tank with mathematical equations to calculate the force and stress of the at least a tank.

Now referring to FIG. 2, shown is an exemplary embodiment of at least a tank 116. In FIG. 2, force and stress of at least a tank 116 may be considered in a cylindrical portion 204 and an end of the cylindrical portion. Stress within cylindrical portion may be calculated according to:

$$\text{Stress} = \frac{\pi r^2 P}{2\pi r t} = \frac{Pr}{2t}$$

where, r is radius of the cylinder, P is pressure, and/is thickness of tank wall. Force at end of the cylinder may be found according to:

Force=$\pi r^2 p$

A key component that may heavily impact shape of at least a tank 116 is pressure. At least a tank 116 may be far lighter if pressure is resisted in pure tension as compared to bending. In some embodiments, pure tension in a tank may be generally achieved by shapes that provide a circular cross section, including spheres, cylinders, and cones. In an embodiment, a pressurized tank of a given volume may be made as a sphere to place the tank in pure tension. Alternatively, a tank made as a cube may require tank walls to operate in bending; thus, the cube tank would likely be vastly heavier than a sphere tank of similar volume. Accordingly, in some embodiments, any tank geometry may provide tank walls acting in tension. Tank geometry is further described in FIGS. 3A-N.

Still referring to FIG. 2, the walls of at least a tank 116 may operate at or below a limit stress. A "limit stress" is a threshold stress below which at least a tank 116 may operate at to avoid failure or damage. Stress may be defined in hoop direction or longitudinal direction. As shown in FIG. 2, stress of a thin-wall cylindrical tank may be calculated in the hoop direction by multiplying the pressure (e.g., in lb/in$^2$) by the radius (e.g., in inches), and then dividing that value by the tank wall thickness (e.g., in inches). Also as shown in FIG. 2, the stress of a thin-wall cylindrical tank may be calculated in the longitudinal direction by dividing the hoop stress in half. The mathematical equation shown for stress may be found by first calculating a force by multiplying pi by the radius squared and the pressure. The force is then divided by 2*π*r*t to calculate the stress. Thus, the equation simplifies to half the hoop stress, or P*r/2*t. The maximum stress in a cylindrical tank is the vector sum of the hoop and longitudinal stresses. A thin-wall hemisphere provides equal stress everywhere of P*r/2*t. A cylindrical tank may be fabricated with end caps. As used in this disclosure, an "end cap" is an end of a tank and/or a compartment of a tank. End caps, like tanks themselves, may have curvature. Generally, end caps may have a constant curvature, for example spherical. In some cases, end caps may be nearly-spherical, elliptical, cylindrical, or the like. In some cases, an end cap may be spherical and have a radius similar to that of the cylinder which it is capping. In this case, the end cap may be considered ideally selected for resisting stresses, however more volume within the aircraft cabin is likely wasted (from the bulging end cap. Instead in some cases, end cap may be selected to compromise resistance to stress in exchange for improved cabin volume utilization. For example, where end caps are spherical and have twice the radius of the cylinder they are capping, stresses in all parts of the tank may be similar or below that of those stresses within the cylindrical portion of the tank (assuming tank skin thickness is constant).

Figure 3A:
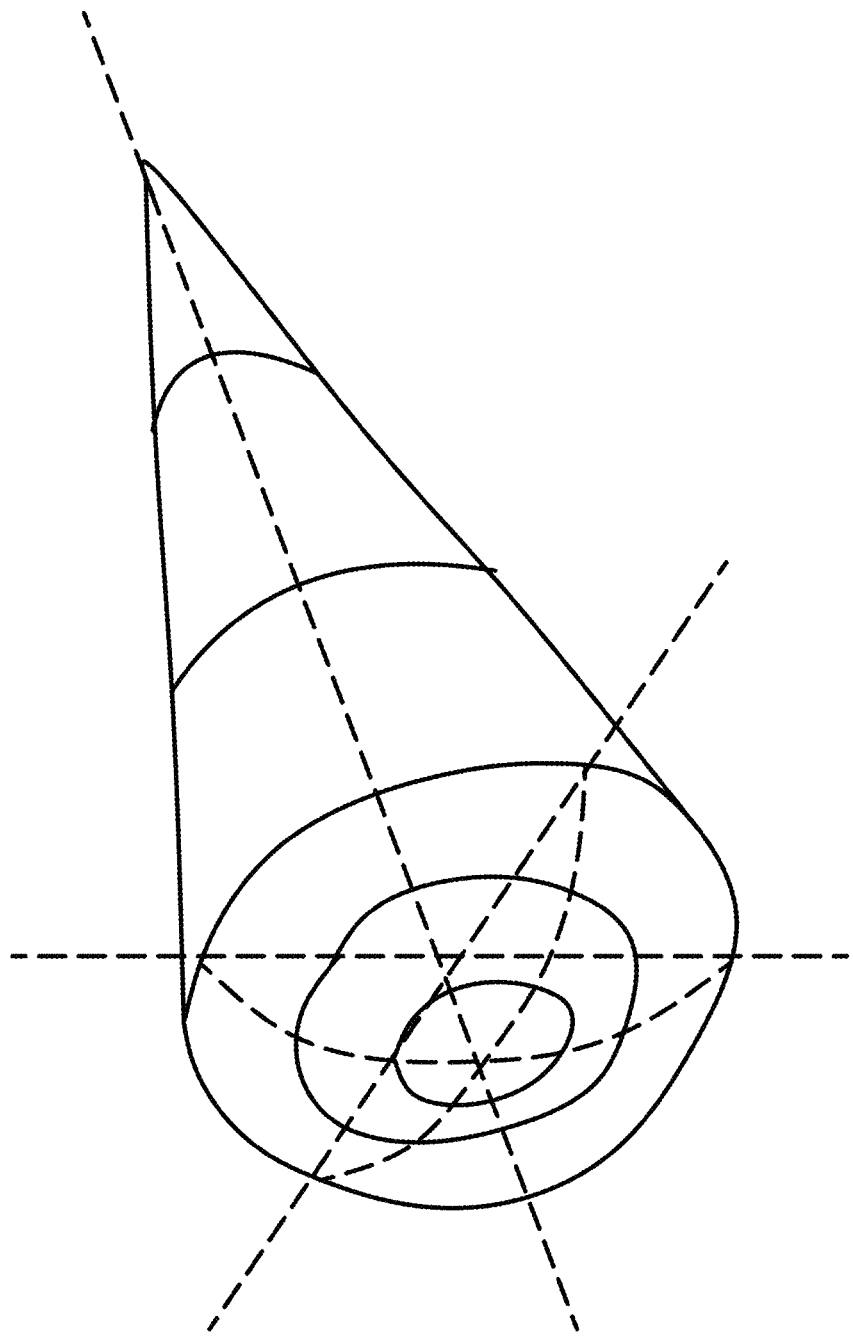
FIG. 3A is an isometric view of an exemplary embodiment of a conical tank.

Now referring to FIGS. 3A-N, exemplary tank geometries are illustrated. At least a tank 116 may include a shape, or tank geometry, having a plurality of curved surfaces. All tank geometries may exist in pure tension, and at least a tank 116 may have any of the tank geometries described herein.

Now referring to just FIG. 3A, an isometric view of an exemplary embodiment of a conical tank is illustrated. At least a tank 116 may be a conical tank. A "conical" tank is a type of tapered tank that has a cone-shaped tank geometry. Conical pure-tension tank shapes may include spherical and cylindrical shapes, possibly with spherical end caps. For example, a tank could be conical with a spherical end cap. This might resemble an ice cream cone. This cone may be truncated, with another spherical end cap on the opposing end.

Figure 3B:
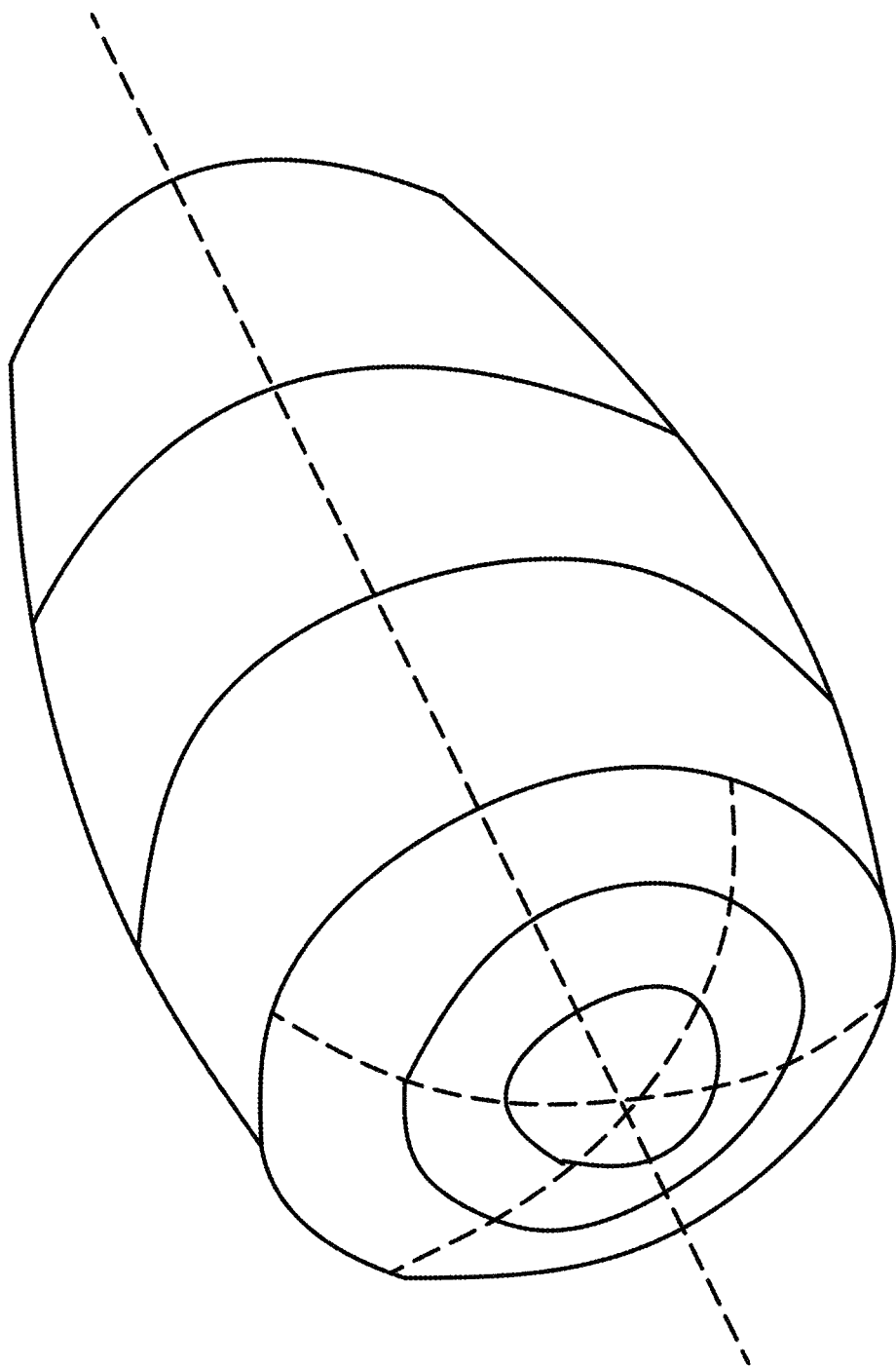
FIG. 3B is an isometric view of an exemplary embodiment of a curved axisymmetric tank.

Now referring to FIG. 3B, an isometric view of an exemplary embodiment of a curved axisymmetric tank is exhibited. At least a tank 116 may be a curved axisymmetric tank. Another type of tapered tank, a "curved axisymmetric tank" has a circular cross-section with compound curvature on the sides or ends. Curved axisymmetric tank may be capped with hemispheres. A curved axisymmetric tank may more efficiently fill a volume with variable depth.

Figure 3C:
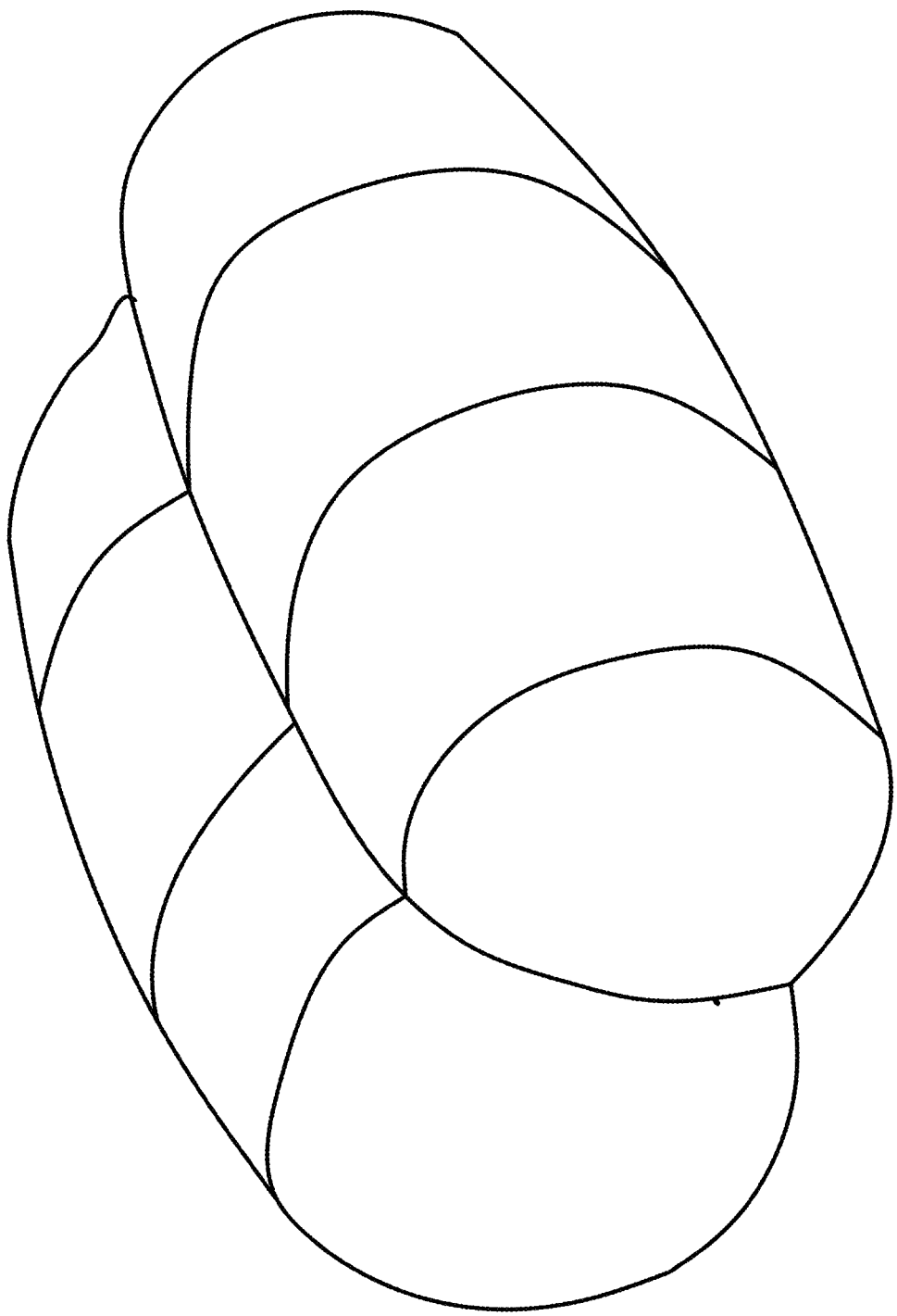
FIG. 3C is an isometric view of an exemplary embodiment of a double-curved tank.

Now referring to FIG. 3C, an isometric view of an exemplary embodiment of a double-curved tank is presented. At least a tank 116 may be a double-curved tank. A "double-curved tank" occurs when a tapered tank is merged with a similar or mirror-image tank with a central septum. The two tanks comprising a double-curved tank may be intersected along their length and a septum may be placed at the tank junction to address the resulting tension. In this disclosure, a "central septum" is a partition centrally located in a system separating two compartments. In some cases, central septum may not be parallel to the tank axis; for example, it may be favorable to fill a volume of constant width with a curved, variable-height ceiling. Tank axis may then be adjusted so that the tank wall on the outer side of the tank may be a selected distance from the cabin wall.

Figure 3D:
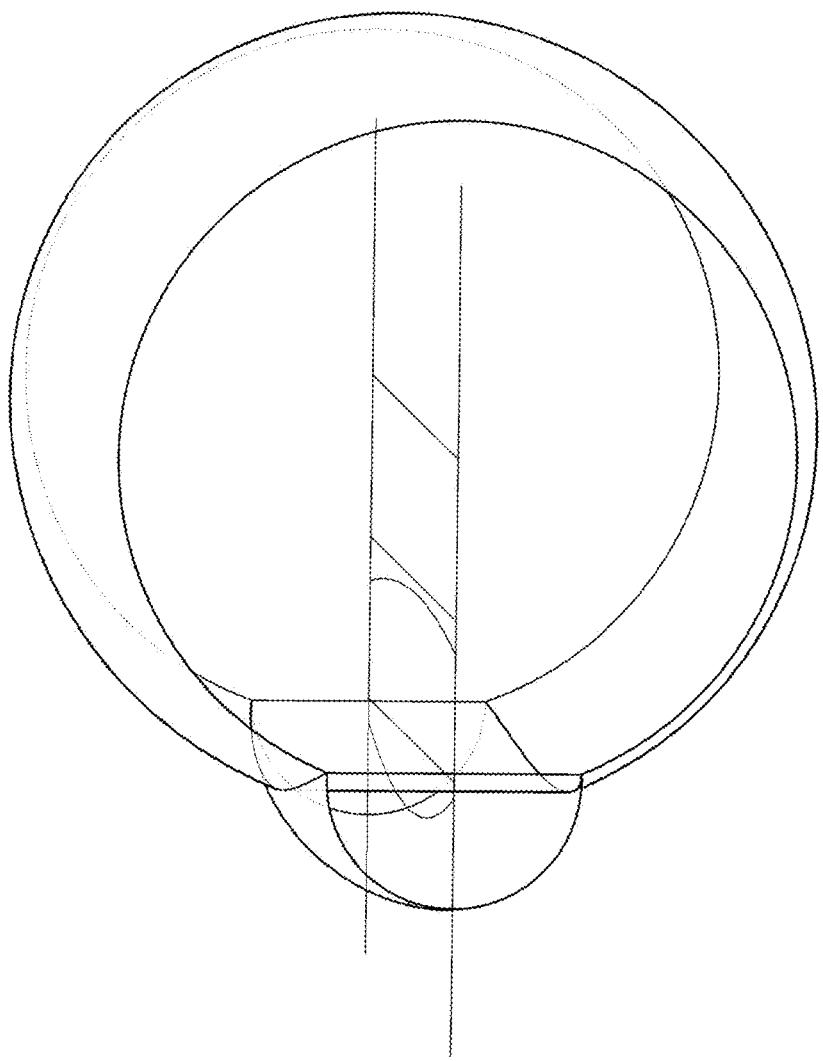
FIG. 3D is a front quarter view of an exemplary embodiment of a dual tank with different diameters.

Now referring to FIG. 3D, a double-curved tank need not have identical compartments; a front quarter view of an exemplary embodiment of a dual tank with different diameters is illustrated. At least a tank 116 may be a dual tank with different diameters. In some compartments in this embodiment, height on one side of the compartment may be lower than on the other. Two or more compartments in at least a tank 116 may have different diameters if the ceiling height is different across the cabin. The two or more tanks may be joined with one or more septa that may form a curved surface as seen in top view, see cambered tanks below. In an embodiment, the shapes of the compartments may differ. In this case, the two merged tanks (dual tank) may have different diameters to maximize their height along their length.

Figure 3E:
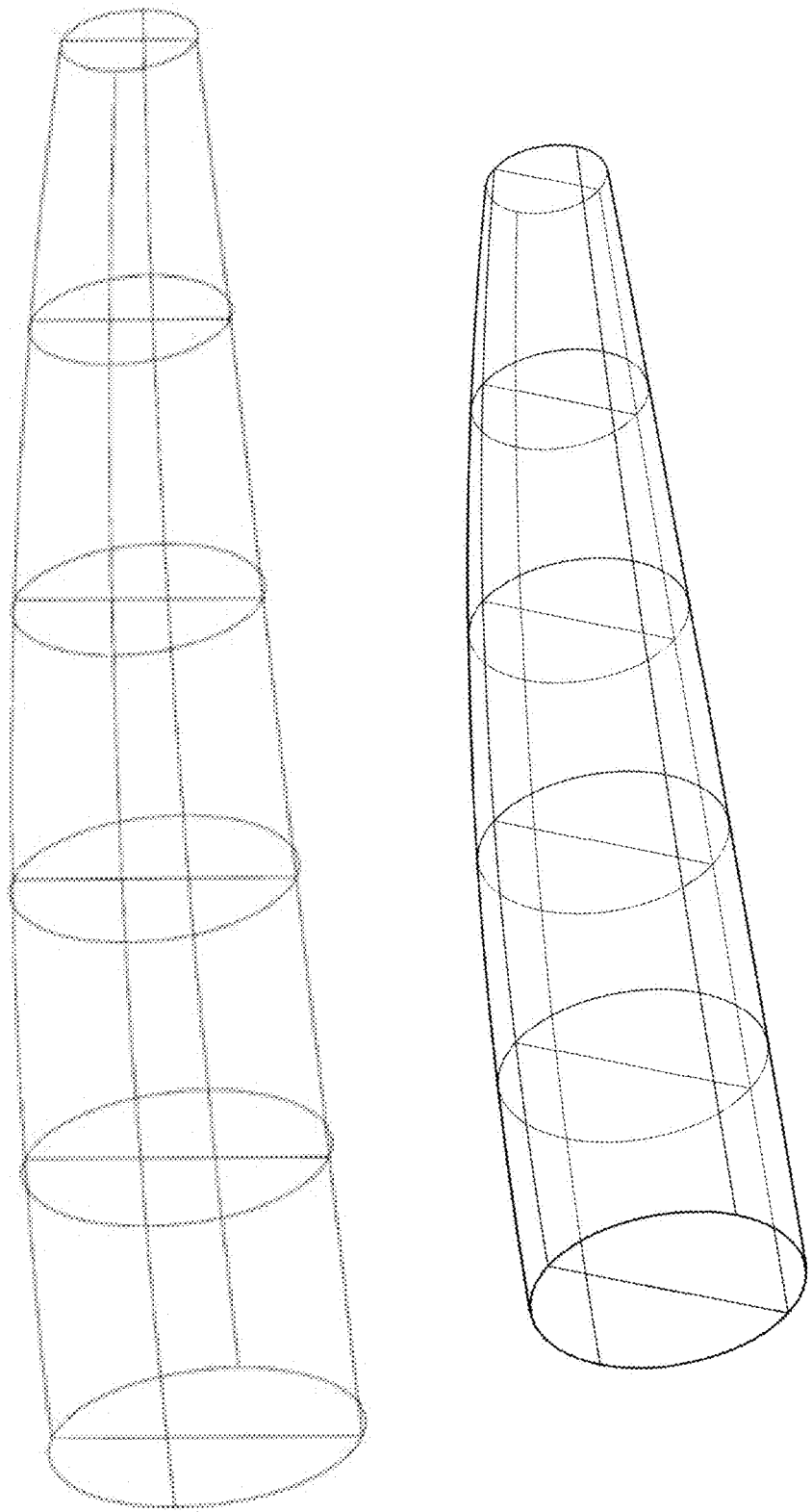
FIG. 3E is a quarter side view of an exemplary embodiment of a cambered, tapered tank.

Now referring to FIG. 3E, some tapered tanks may be sheared so that instead of following a straight centerline, at least a tank 116 follows a curved camber line. Shown in FIG. 3E is a quarter side view of an exemplary embodiment of a cambered, tapered tank. The camber line enables the tank to more efficiently fit a volume with variable depth but one flat side, for example a floor, while conforming more closely to, for example, a curved ceiling. This results in a centerline that may be curved as seen in the figure. An example may be shown in wireframe and surfaced views. This tank geometry may have a flat bottom and a curved top.

Figure 3F:
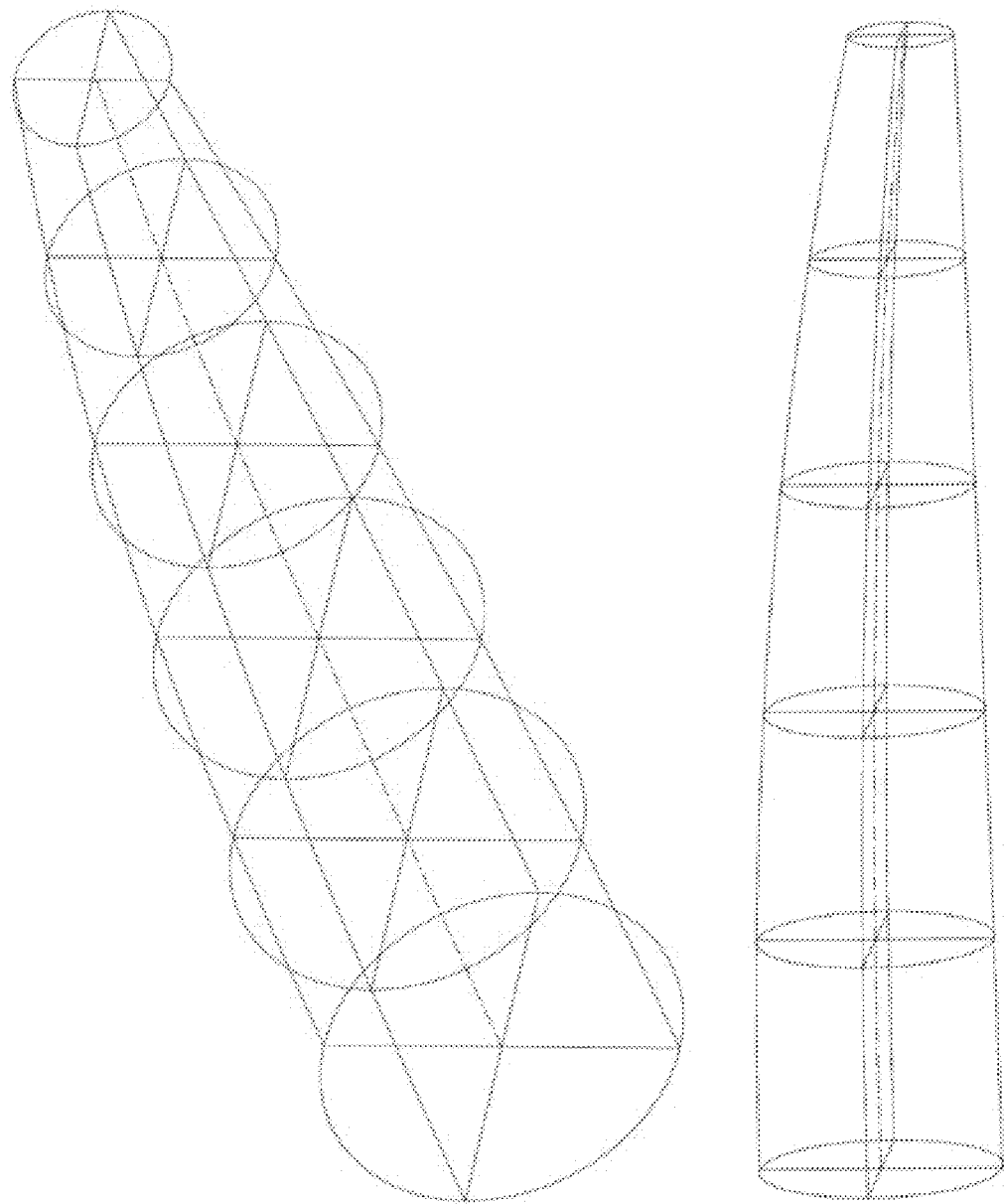
FIG. 3F illustrates an isometric and side quarter views of an exemplary embodiment of a dual cambered tank.

Now referring to FIG. 3F, an isometric and side quarter views of an exemplary embodiment of a dual-cambered tank is presented. At least at tank 120 may be a dual-cambered tank. A "dual-cambered" tank is the same as normal cambered tank, but the camber line may be curved from the top view as well as the side view. Two cambered lines can place the outer surface of the tank at a selected distance from the cabin wall. The bottom and right edge of at least a tank 116 may be straight while the top view and side view of camber line may be curved. Circular cross sections of the tank may be sheared so that they remain circles in the lateral-vertical plane, for example. Alternatively, circular cross sections may be orthogonal to the camber line. From a stress standpoint, wherever the camber line curvature of the tank is modest, the stress difference is probably very small.

Figure 3G:
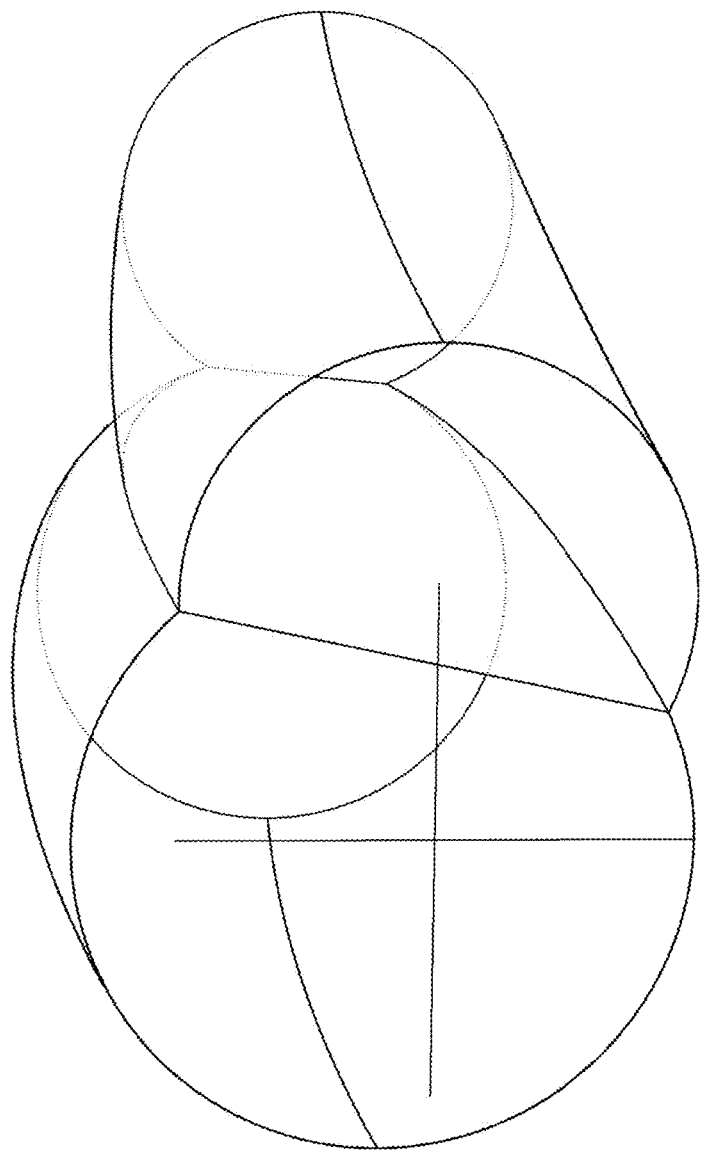
FIG. 3G shows a quarter front view of an exemplary embodiment of a double tank.

Now referring to FIG. 3G, a quarter front view of an exemplary embodiment of a double tank is shown. The double tank, as explained above, may have a curved septum separating the two compartments of at least a tank 116.

Figure 3H:
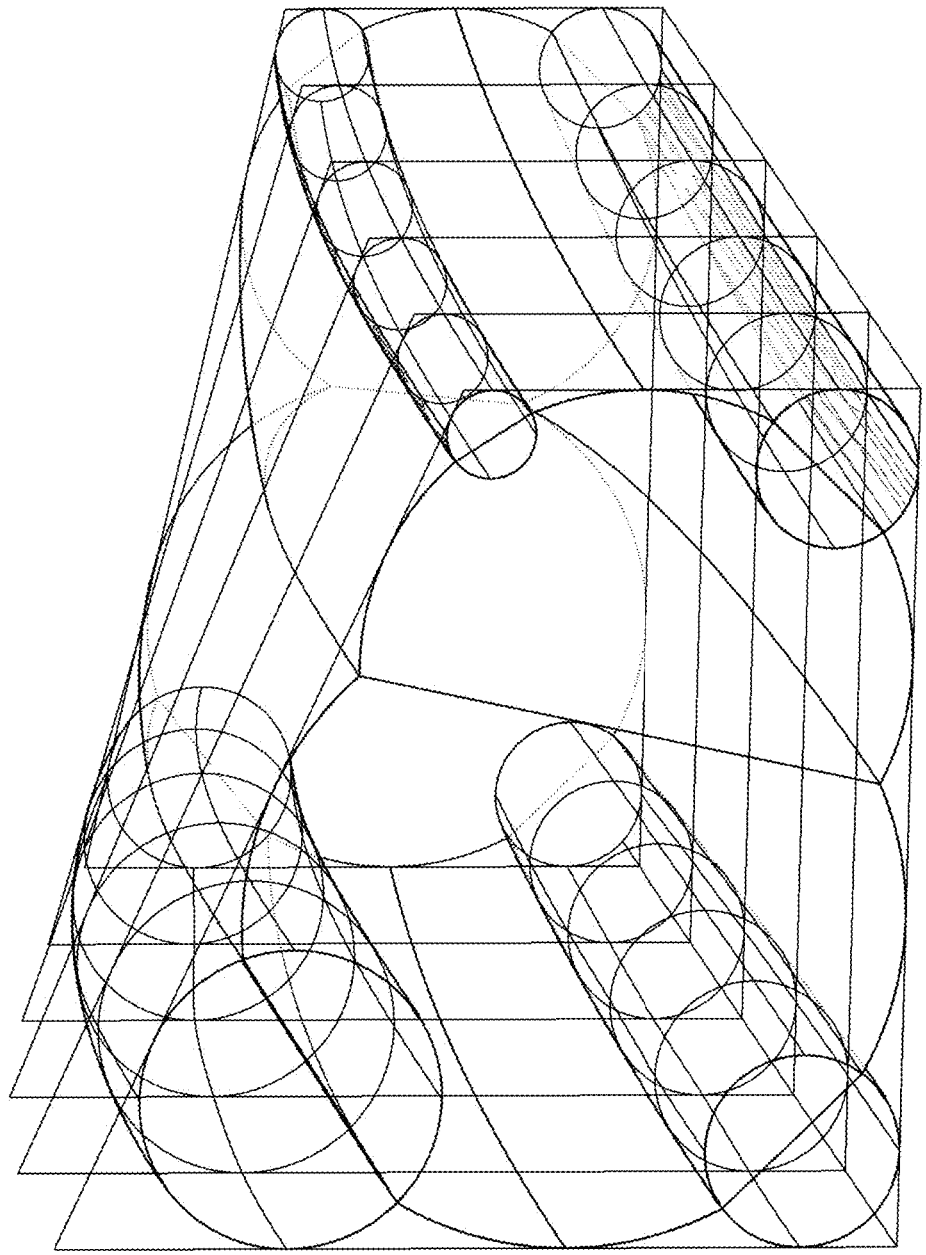
FIG. 3H is a front quarter view of an exemplary embodiment of a multi-bubble tank without trimming.
Figure 3I:
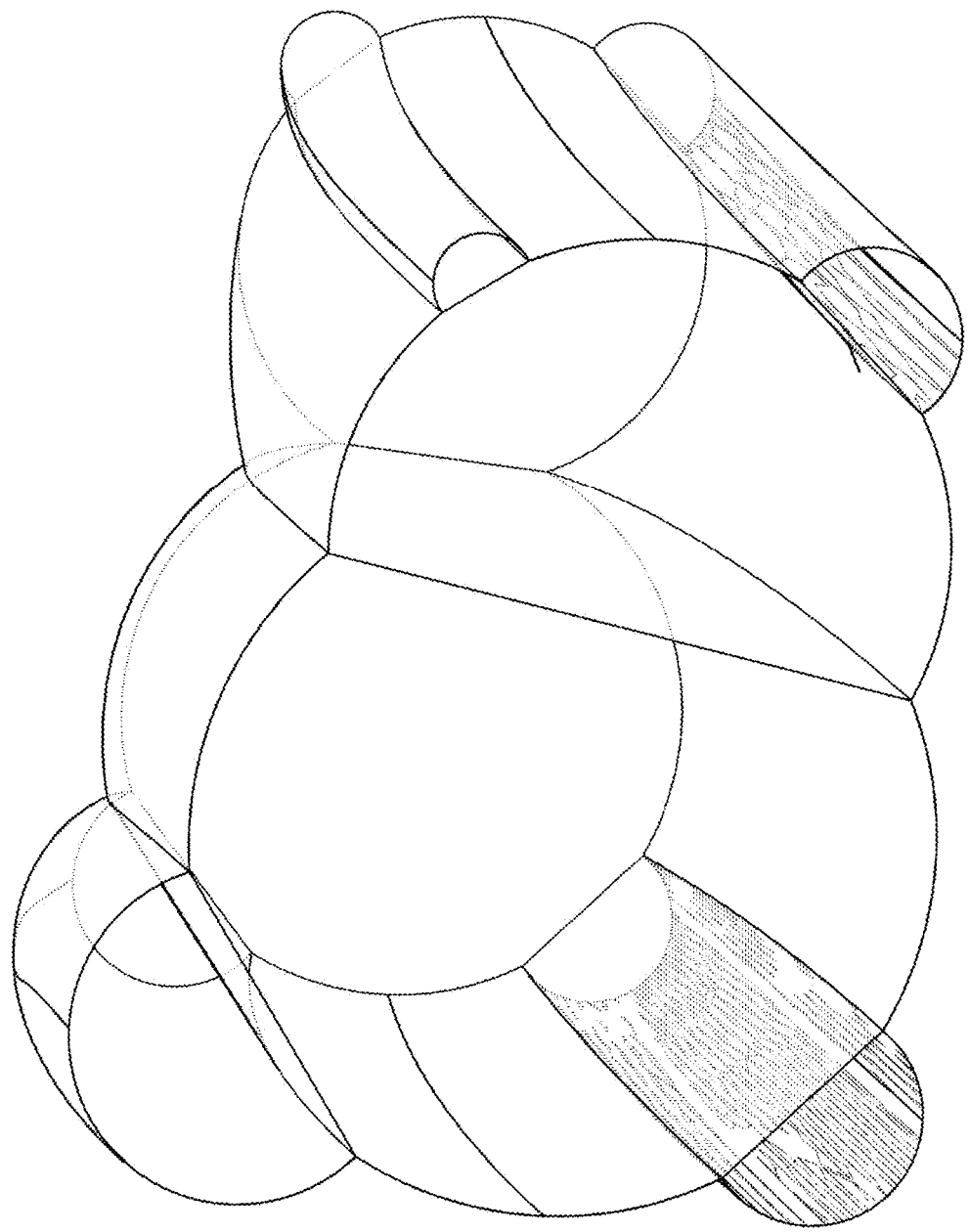
FIG. 3I is a front quarter view of an exemplary embodiment of a multi-bubble tank trimmed with septa.

Now referring to FIGS. 3H and 3I, a front quarter view of an exemplary embodiment of a multi-bubble tank is illustrated in both figures. Given a rectangular cabin cross-section with a longitudinally oriented tank, this cross-section may be occupied by a single circular cross-section tank. Or, as noted above, a double tank may be used to provide greater cross-section area within the rectangular cabin. Additional bubbles may be added to fill in the four corners. A "multi-bubble tank" is a tank that has more than two compartments attached together. In some cases, two more bubbles may be added to fill in the valleys between the two main tanks. Multi-bubble tanks may have any number of compartments, but there may be a diminishing return on increasing complexity; either engineering judgment or actual engineering may be applied. In an embodiment, a multi-bubble tank may have four lobes added to fill in the corners of a notional envelope indicated by the lines in the figure. This provides a more valuable tank volume for a given compartment volume. Each compartment may have a circular cross section as shown, which may be trimmed to the large, main lobes. The main lobes may then be trimmed to small lobes. Each junction may be then faced with a septum. This "trimming" can be seen in FIG. 3I, wherein the tank is trimmed with septa. On the other hand, the multi-bubble tank in FIG. 3H does not have trimming. At least a tank 116 may or may not have trimming.

Figure 3J:
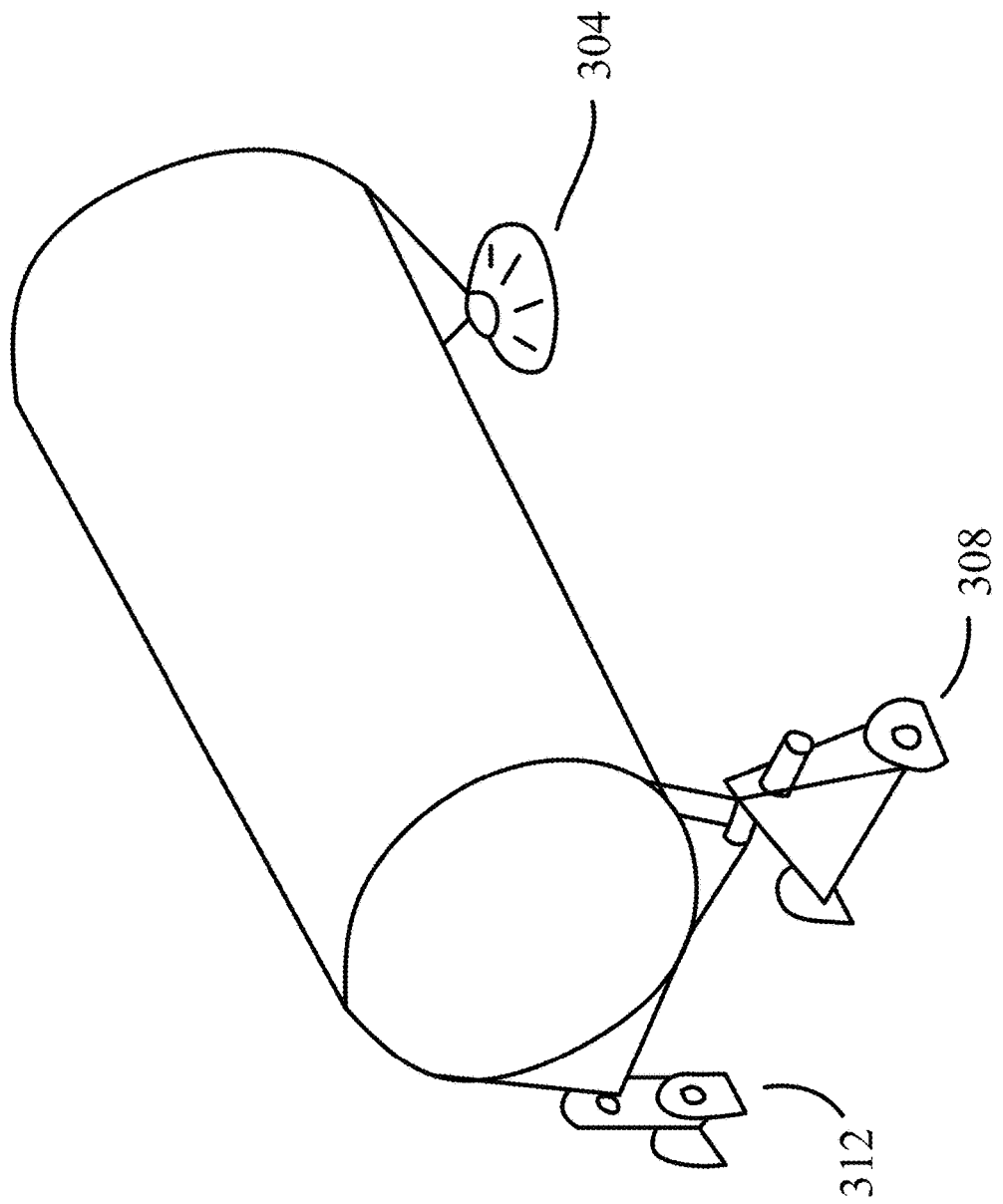
FIG. 3J illustrates an isometric view of an exemplary embodiment of a tank with a plurality of tank support links.

Now referring to FIG. 3J, an isometric view of an exemplary embodiment of a tank with a plurality of tank support links is shown. At least a tank 116 needs to be mounted into aircraft 100, usually inside the body. As explained above, at least a tank 116 may be a permanent tank, meaning it may be mounted to the aircraft for an extended period of time. At least a tank 116 and blended wing body 104 may be constructed separately, and then at least a tank 116 may be mounted within. In an embodiment, at least a tank 116 and BWB 104 may be independent because the structural load paths of aircraft 100 may not pass through at least a tank 116, and the structural load paths of at least a tank 116 may not pass through BWB 104, except insofar as necessary to restrain at least a tank 116 within BWB 104. Given this constraint, there are at least two conceptual methods for tank support links to mount at least a tank 116 to BWB 104: rigid and linked mounts.

Still referring to FIG. 3J, at least a tank 116 may be mounted to BWB 104 using a rigid mount. At least a tank 116 may be a standalone structure and may be connected to the BWB 104 with one or more rigid connections. A "rigid mount" or "rigid connection" is a type of link that does not allow for free movement in any direction; the link is rigid and/or non-movable. For example, if at least a tank 116 is a longitudinally-mounted cylindrical tank, it may have a series of feet on either side, which may be connected to the structure of at least a tank 116. These feet may also be connected, for example, to a cabin floor structure. Additionally, the rigid mount may impose loads on BWB 104 and at least a tank 116. In an embodiment, during a flight maneuver, aircraft 100 may stretch, compress, or deform slightly, which may ultimately and slightly alter the location of the example feet mounting points. Overall, this ensues some deformation of the structure of at least a tank 116 and may impose additional loads on the tank that result in an unfavorably heavier design. Additional feet may be provided to distribute the load of at least a tank 116 more widely into BWB 104. For example, feet may also connect the tank to cabin walls, the cabin ceiling structure and the cabin aft pressure bulkhead. This arrangement may not be intended to reinforce BWB 104 by its connection to at least a tank 116. Also, it may not be intended to reinforce at least a tank 116 by its connection to BWB 104.

Still referring to FIG. 3J, at least a tank 116 may be mounted to BWB 104 using a linked mount. A standalone tank structure may be connected to the airframe in such a way that airframe deformation may not result in tank deformation, and vice-versa. This can be achieved through two ways to mount the tank: through its feet as described above, and through a series of links that may have hinges or ball-joints. A "linked mount" is a way to attach an object to another object that allows movement in one or more directions. With reference to the feet of at least a tank 116 as described above, to avoid structure deformation, the feet may be mounted to the airframe with rubber fittings that provide compliance. Exemplary feet include mounts manufactured by LORD Corp., of Williston, Vermont. A series of links that may have hinges or ball-joints may also mount at least a tank 116 to aircraft 100 without structural deformation occurring. For example, and as shown in the figure, at least a tank 116 may be mounted at three points forming a triangle: a first point may be a rigid connection that provides location in three axes, a second point may be a link that provides substantially two (vertical and lateral) location, and a third point may be a link that provides substantially one (vertical) location. These three points are seen in the figure as links 304, 308, and 312, respectively. Link 304 may support vertically, laterally and longitudinally. Link 308 may support vertically and laterally because it may be pivoted about a lateral axis. Link 312 may provide only vertical support because it has ball joints at each end. A combination of links 304 and 308 may resist yaw and pitch motion. A combination of links 308 and 312 may resist roll. Altogether, motion of at least a tank 116 may be restrained against motion and rotation through the use of tank support links. A relative change in length between at least a tank 116 and BWB 104 may be accommodated by Links 308 and 312 pivoting fore-aft. A relative change in width may be accommodated by Link 312 pivoting laterally. A relative change in height may be unconstrained. Torsion applied to at least a tank 116 by Links 308 and three may be accommodated by a spherical or cylindrical connection at link 304. One skilled in the art can provide alternate ways to achieve these objectives.

Figure 3K:
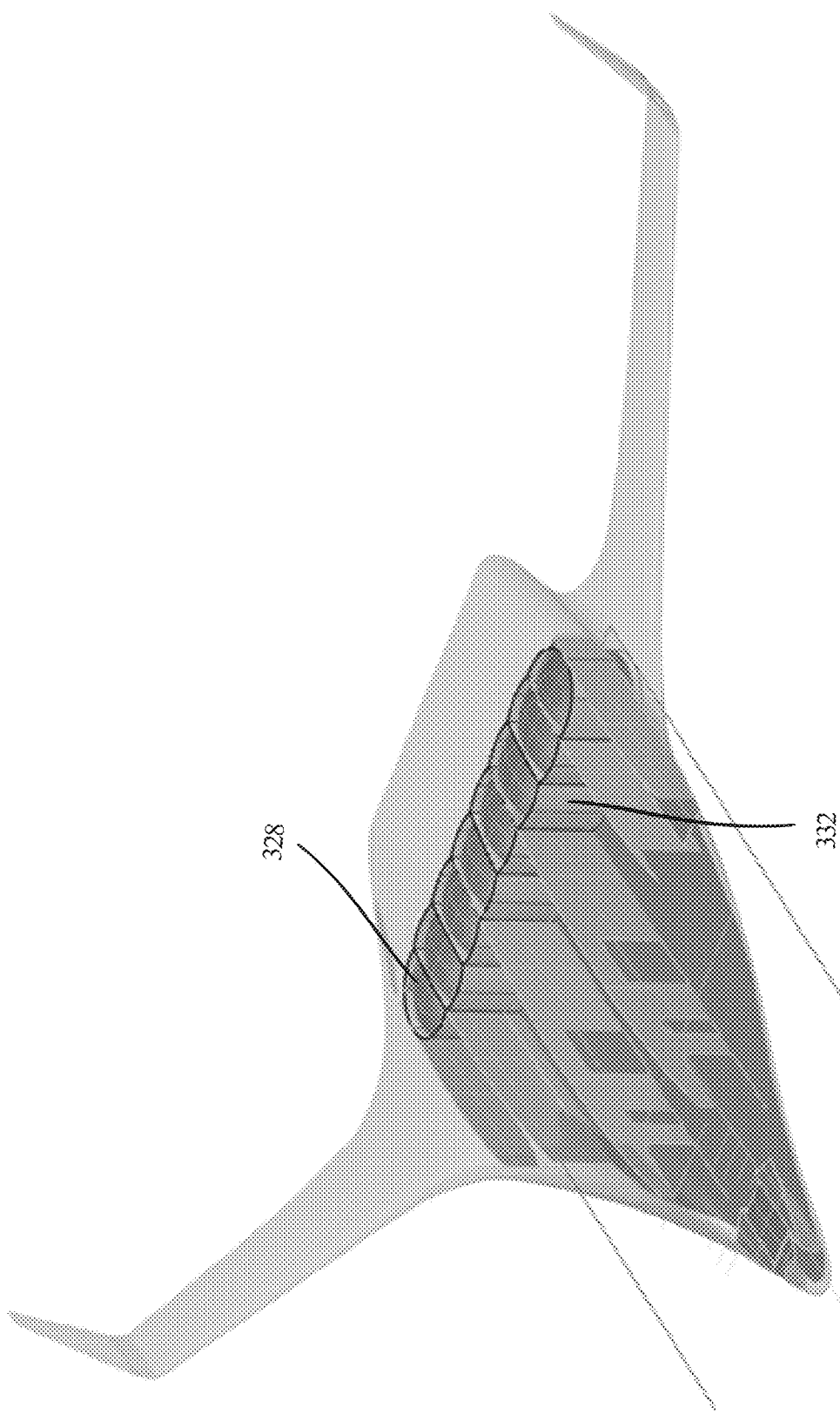
FIG. 3K shows an exemplary embodiment of an overview of a vertical axis "air mattress" tank.
Figure 3L:
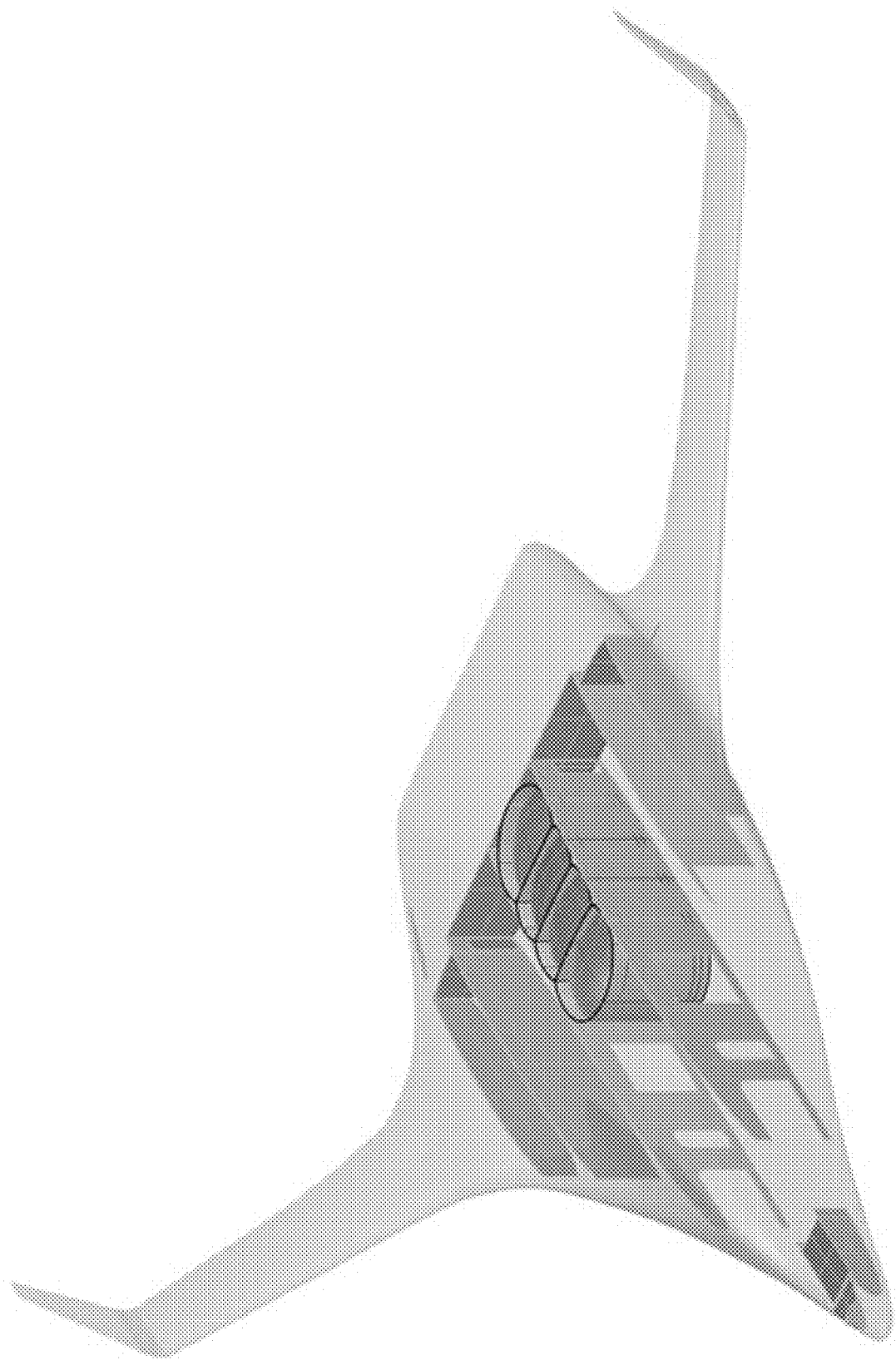
FIG. 3L shows an exemplary embodiment of an overview of longitudinal arrangement of a vertical axis "air mattress" tank.

Now referring to FIG. 3K, an exemplary embodiment of an overview of a vertical axis "air mattress" tank is exhibited. An "air mattress" tank refers to a multi-bubble tank, where each of a lobes' upper and lower surfaces have a common center point. When the lobes of at least a tank 116 do not form a near-circular shape, the surface of at least a tank 116 may deform in order to achieve pure tension. As shown in the figure, the "air mattress" may extend laterally. Additionally, for example, "air mattress" may extend longitudinally as shown in FIG. 3L. In an embodiment and as described above, at least a tank 116 may be a vertically oriented multi-bubble tank wherein its pressurized walls and its septa may extend from a lower outer mold line to an upper outer mold line of a blended wing body. A top and bottom of at least a tank 116 may be closed out by end caps inset from the outer mold line to provide room for the outer mold line skin's supporting structure. This may assist BWB 104 in resisting pressurization and simultaneously carrying the shear stress that is otherwise carried by structural members of BWB 104. Also, as shown, at least a tank 116 may extend across the full width of the cabin and outboard cargo bays.

With continued reference to FIG. 3K, in some embodiments, at least a tank 116 may connect the at least a tank to at least an upper skin and at least a lower skin of the blended wing body. Furthermore, the upper and lower skins of BWB 104 may be structurally supported by one or more septa of at least a tank 116. In this disclosure, the "upper and lower skins" of the BWB 104 refer to the upper and lower surfaces of an outer mold line of BWB 104. In some cases, center body of BWB 104 may be pressurized, relative ambient pressure which is typically below atmospheric (sea level) pressure at elevation. Therefore, in some cases, an upper skin and a lower skin may be forced away from one another by a resultant pressure differential. In some embodiments, additional structural support between walls of at least a tank 116 (e.g., septa and/or tank walls) and upper and lower skins of BWB 104 may resist pressure. In some cases, use of at least a tank 116 as a structural element of BWB 104 may reduce weight. In FIG. 3K, walls of at least a tank 116 may be shown to extend to upper and lower skins, while end caps 328 of at least tank 116 may be shown inset to provide clearance from the structure that supports the skins.

Now referring to FIG. 3L, an exemplary embodiment of an overview of longitudinal arrangement of a vertical axis "air mattress" tank is shown. As said above, the "air mattress" extends laterally but could also, for example, extend longitudinally. FIG. 3L shows at least a tank 116 within a center bay. There are many ways to arrange vertical "air mattress" type tanks and this longitudinal arrangement may provide mutual support between BWB 104 and at least a tank 116. In some embodiments, a length of at least tank 116 into BWB 104 may be varied by either varying a diameter of at least a tank 116 or by doubling (or more) a number of rows of at least a tank 116. In a doubled tank, there may be a center lateral septum that replaces what is shown as the forward curved tank walls 332; this septum may be planar. In some cases, doubling (or more) the number of rows of at least a tank 116 may result in a smaller tank wall radius and a thinner and lighter tank wall (when compared to a single row of equal total longitudinal dimension).

Figure 3M:
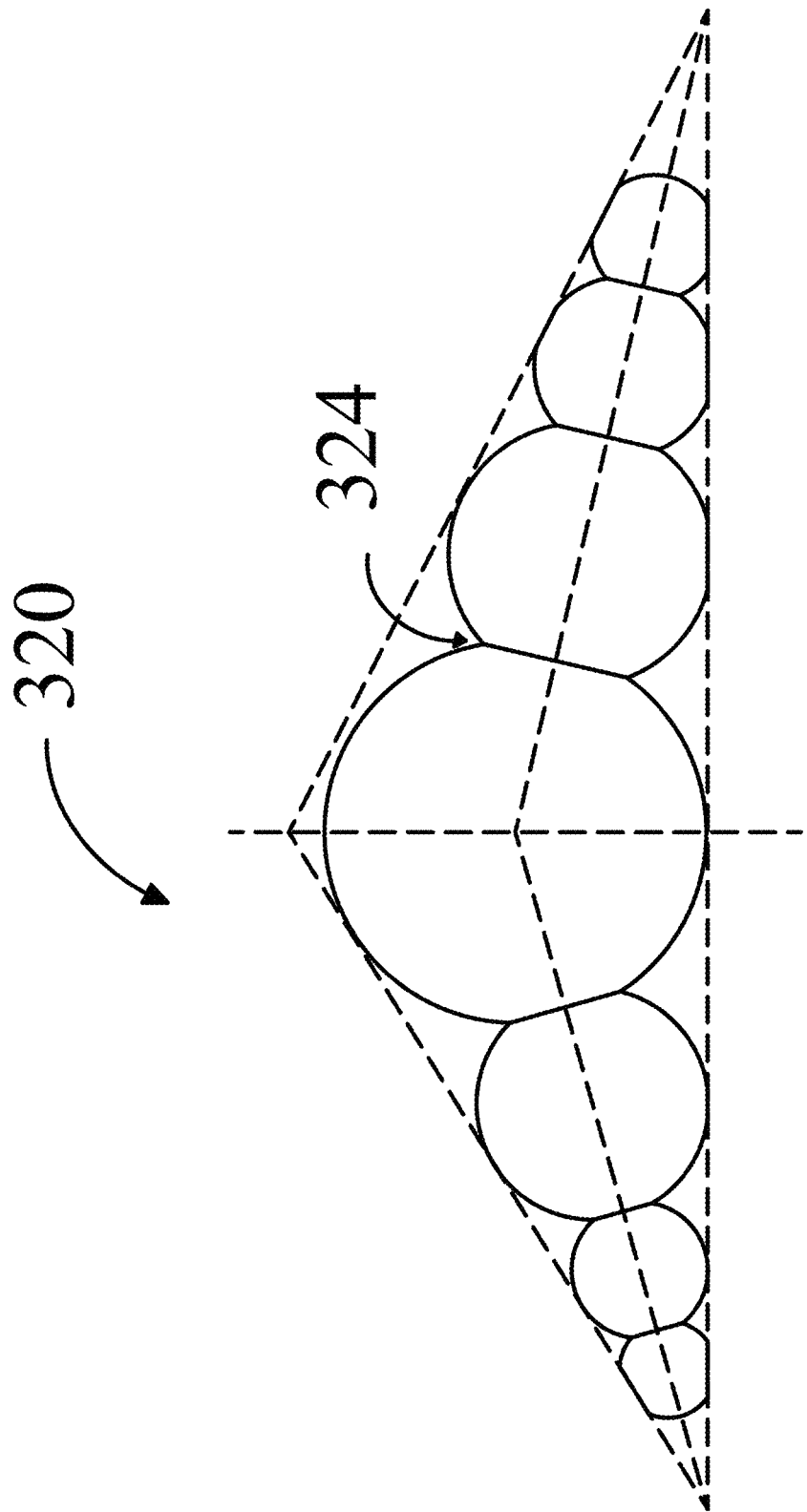
FIG. 3M illustrates a cross-section of an exemplary multi-chambered tank.

Now referring to FIG. 3M, an exemplary embodiment of a cross-sectional view of tank having multiple chambers is illustrated. Multi-chambered tank 320 may provide pure tension for each chamber wall and septa at each junction 324. Pure tension may be achieved by equal pressure in each chamber of the tank 320. In some cases, junctions 324 may include convex junctions. Each of the junctions illustrated in FIG. 13 are shown as convex junctions 324.

Figure 4:
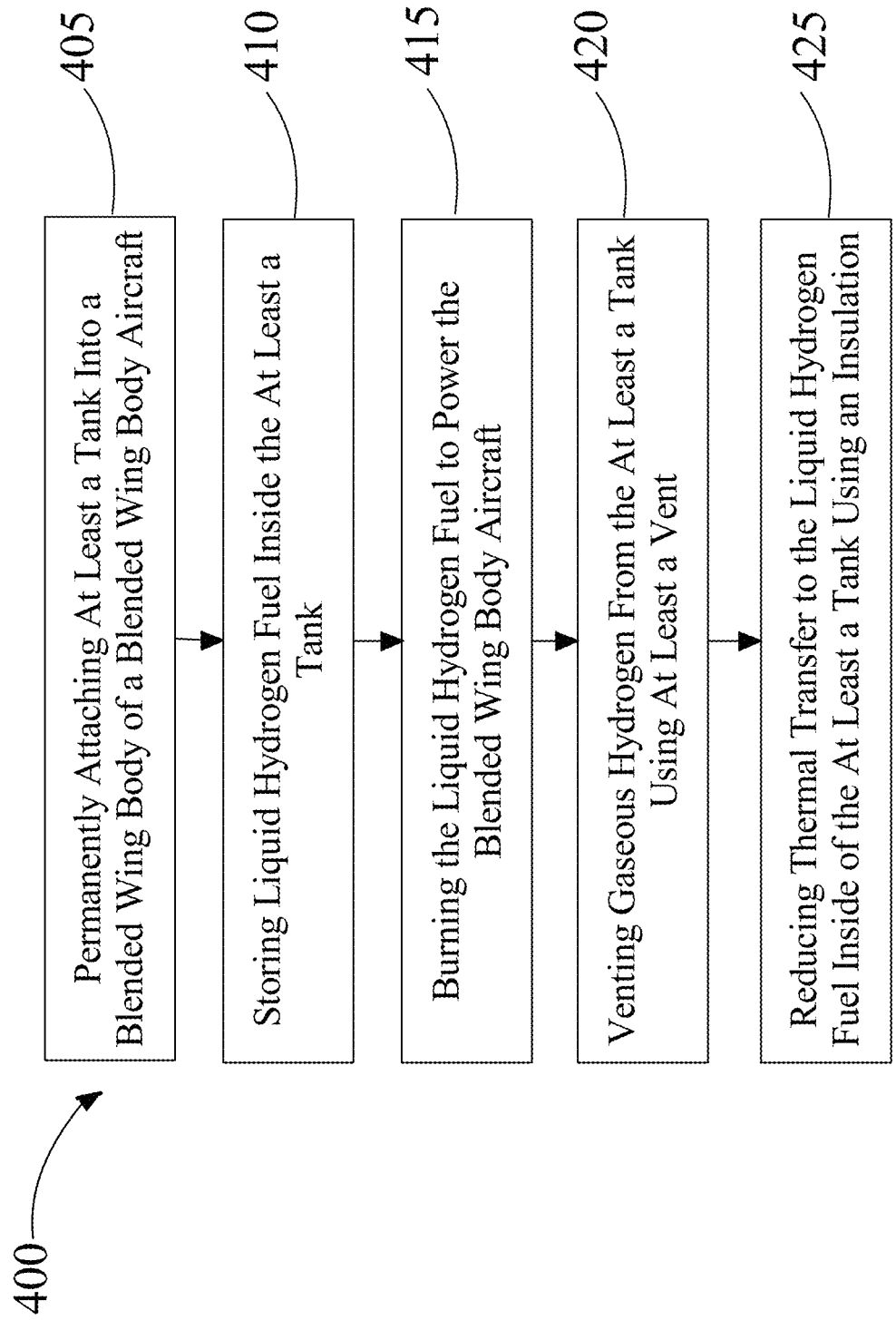
FIG. 4 is a block diagram for a method of use for a blended wing body aircraft with permanent tanks.

Now referring to FIG. 4, a block diagram for a method 400 of use for a blended wing body aircraft with permanent tanks is illustrated. Blended wing body aircraft may be any of the blended wing body aircraft described herein with reference to FIGS. 1A, 1B, and 2. Permanent tank may be any of the tanks described herein with reference to FIGS. 1A-3L.

Still referring to FIG. 4, at step 405, method 400 of use comprises permanently attaching at least a tank 116 into a blended wing body 104 of blended wing body aircraft 100. At least a tank 116 is a pressure vessel. At least a tank 116 further comprises a shape having a plurality of curved surfaces. At least a tank 116 further comprises at least a septum. At least a tank 116 further comprises an inner wall and an outer wall. Blended wing body aircraft may be any of the blended wing body aircraft described herein with reference to FIGS. 1A, 1B, and 2. At least a tank 116 may be any of the tanks described herein with reference to FIGS. 1A-3L.

Still referring to FIG. 4, at step 410, method 400 of use comprises storing liquid hydrogen fuel 120 inside the at least a tank 116. Liquid hydrogen fuel 120 may be any of the liquid hydrogen fuels as described herein with reference to FIG. 1B. At least a tank 116 may be any of the tanks described herein with reference to FIGS. 1A-3L.

Still referring to FIG. 4, at step 415, method 400 of use comprises burning the liquid hydrogen fuel 120 to power blended wing body aircraft 100. Liquid hydrogen fuel 120 may be any of the liquid hydrogen fuels as described herein with reference to FIG. 1B. Blended wing body aircraft may be any of the blended wing body aircraft described herein with reference to FIGS. 1A, 1B, and 2.

Still referring to FIG. 4, at step 420, method 400 of use comprises venting gaseous hydrogen from the at least a tank 116 using at least a vent 124. Venting gaseous hydrogen from the at least tank 120 prevents over-pressurizing. At least a tank 116 may be any of the tanks described herein with reference to FIGS. 1A-3L. At least a vent 124 may be any of the vents described herein with reference to FIG. 1B.

Still referring to FIG. 4, at step 425, method 400 of use comprises reducing thermal transfer to the liquid hydrogen fuel 120 inside of the at least a tank 116 using an insulation 128. Insulation 128 of the at least a tank 116 includes a chamber located between the inner wall and the outer wall of the at least a tank 116. Chamber contains gas that is actively pumped, for example into or out of the chamber. In some cases, actively pumping gas from chamber may reduce density of the gas in chamber, thereby reducing thermal heat transfer through the gas by way of convection and/or convection and improving insulative properties. In some cases, flowing gas from chamber, for example through active pumping, may prevent the gas from exceeding a threshold concentration of hydrogen gas. In some cases, threshold concentration of hydrogen gas may be selected in order to prevent combustion and/or explosion, for instance within the chamber. Liquid hydrogen fuel 120 may be any of the liquid hydrogen fuels as described herein with reference to FIG. 1B. At least a tank 116 may be any of the tanks described herein with reference to FIGS. 1A-3L. Insulation 128 may be any of the insulation described herein with reference to FIG. 1B.

Still referring to FIG. 4, method 400 may further comprise at least a propulsor configured to propel the blended wing body aircraft. Method 400 also comprising a combustion engine configured to burn the liquid hydrogen fuel 120 from the at least a tank 116 and produce mechanical work to use to power the at least a propulsor. At least a propulsor may be any of the propulsors described herein with reference to FIG. 1A. Combustion engine may be any of the combustion engines described herein with reference to FIG. 1A. Liquid hydrogen fuel 120 may be any of the liquid hydrogen fuels as described herein with reference to FIG. 1B. At least a tank 116 may be any of the tanks described herein with reference to FIGS. 1A-3L.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
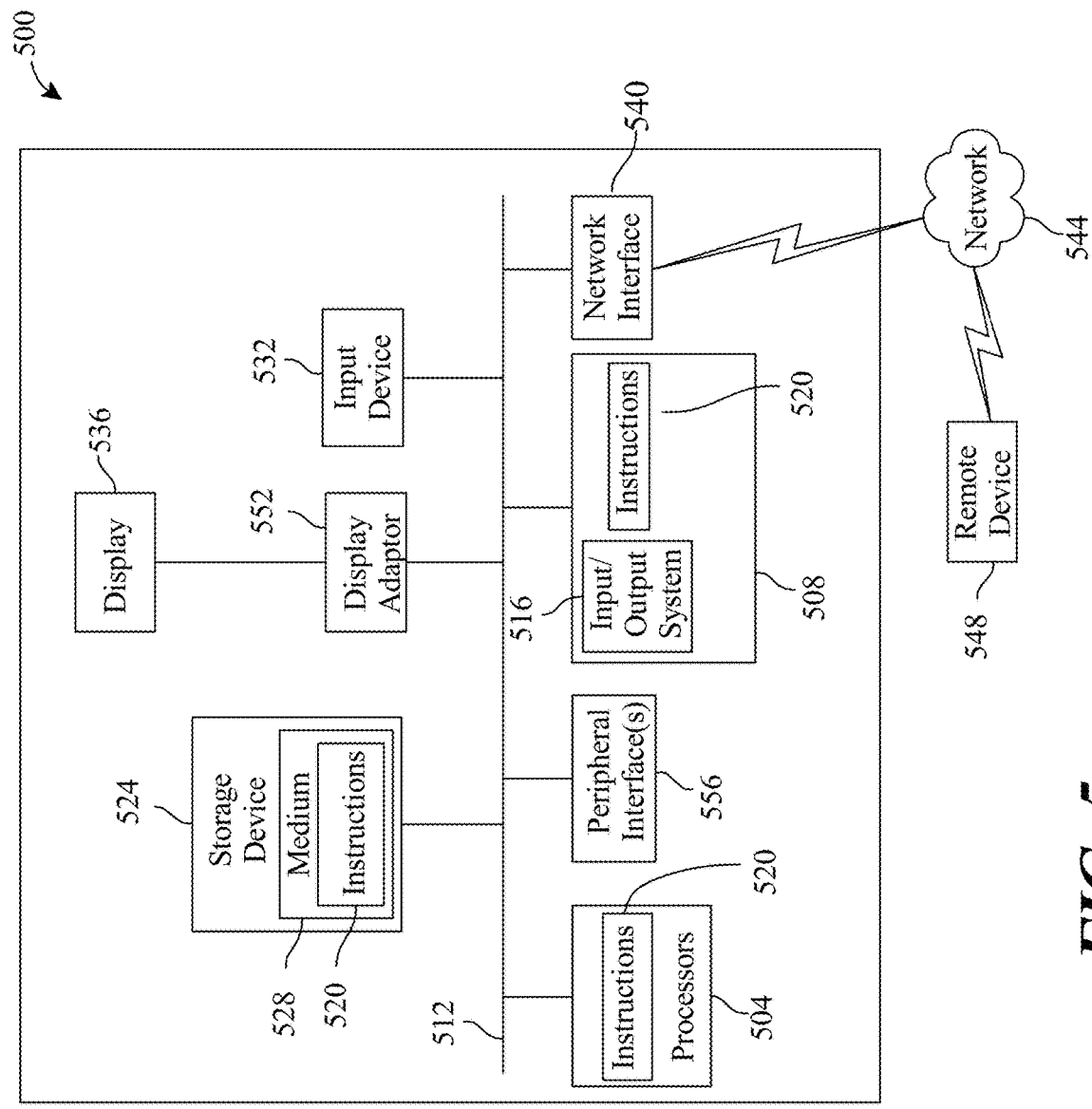
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a blended wing body aircraft with built-in, non-removable tanks, the aircraft comprising:
   a blended wing body having a main body, wings, and transitions attaching the wings to the main body, wherein the blended wing body comprises an airframe and a skin structure, wherein the skin structure comprises an upper skin and a lower skin; and
   at least a tank extending laterally across a full width of the main body and located entirely aft of the transitions, permanently attached to the blended wing body, and configured to store liquified gas fuel, wherein the at least a tank further comprises:
      at least a cylindrical wall arranged with at least an axis of the at least a cylindrical wall running vertically;
      a first end cap attached to and capping the at least a cylindrical wall at a top of the at least a tank, wherein the first end cap is inset from an upper mold line of the blended wing body;
      a second end cap attached to and capping the at least a cylindrical wall at a bottom of the at least a tank, wherein the second end cap is inset from a lower mold line of the blended wing body; and
      at least a septum connecting lines of intersection between a first cylindrical wall and a second cylindrical wall, wherein the at least a septum comprises at least a wall configured to carry structural loads to the skin structure of the blended wing body by at least being connected to the upper skin and the lower skin, wherein ends of the at least a wall extend from the upper skin to the lower skin.

2. The system of claim 1, wherein the at least a tank further comprises a shape having a plurality of curved surfaces.

3. The system of claim 1, wherein venting gaseous fuel from the at least tank prevents over-pressurizing.

4. The system of claim 1, wherein an insulation of the at least a tank includes a chamber located between an inner wall and an outer wall of the at least a tank.

5. The system of claim 4, wherein the chamber contains gas that is actively pumped.

6. The system of claim 2, wherein one or more of the plurality of curved surfaces and the at least a septum connect the at least a tank to the upper skin and the lower skin of the blended wing body.

7. A method of use for a blended wing body aircraft with built-in, non-removable tanks, wherein the blended wing body aircraft comprises a blended wing body having a main body, wings, and transitions attaching the wings to the main body, and the blended wing body comprises an airframe and a skin structure, the method of use comprising:
permanently attaching at least a tank into the blended wing body of the blended wing body aircraft located entirely aft of the transitions, where in the at least a tank extends laterally across a full width of the main body;
storing liquified gas fuel inside the at least a tank, wherein the at least a tank further comprises:
at least a cylindrical wall arranged with at least an axis of the at least a cylindrical wall running vertically;
a first end cap attached to and capping the at least a cylindrical wall at a top of the at least a tank, wherein the first end cap is inset from an upper mold line of the blended wing body;
a second end cap attached to and capping the at least a cylindrical wall at a bottom of the at least a tank, wherein the second end cap is inset from a lower mold line of the blended wing body; and
at least a septum connecting lines of intersection between a first cylindrical wall and a second cylindrical wall, wherein the at least a septum comprises at least a wall;
powering the blended wing body aircraft by burning the liquified gas fuel; and
carrying structural loads to a skin structure of the blended wing body by the at least a wall, wherein the at least a wall is connected to an upper skin and a lower skin of the skin structure, wherein ends of the at least a wall extend from the upper skin to the lower skin.

8. The method of claim 7, wherein the at least a tank further comprises a shape having a plurality of curved surfaces.

9. The method of claim 7, wherein venting gaseous hydrogen from the at least tank prevents over-pressurizing.

10. The method of claim 7, wherein an insulation of the at least a tank includes a chamber located between an inner wall and an outer wall of the at least a tank.

11. The method of claim 10, wherein the chamber contains gas that is actively pumped.

12. The method of claim 8, wherein the plurality of curved surfaces and the at least a septum connect the at least a tank to the upper skin and the lower skin of the blended wing body.

13. The system of claim 1, wherein at least one link from a plurality of links is pivoted about a lateral axis.

14. The method of claim 7, wherein at least one link from a plurality of links is pivoted about a lateral axis.

* * * * *